US012802983B2

(12) United States Patent
Kitajou et al.

(10) Patent No.: US 12,802,983 B2
(45) Date of Patent: Nov. 17, 2026

(54) SODIUM TITANIUM PHOSPHATE SALT AND USE THEREOF

(71) Applicants: YAMAGUCHI UNIVERSITY, Yamaguchi (JP); TOSOH CORPORATION, Yamaguchi (JP)

(72) Inventors: Ayuko Kitajou, Yamaguchi (JP); Maho Yamashita, Yamaguchi (JP); Masaki Okada, Kanagawa (JP); Wataru Kobayashi, Tokyo (JP); Toshiya Takahara, Kanagawa (JP)

(73) Assignees: YAMAGUCHI UNIVERSITY, Yamaguchi (JP); TOSOH CORPORATION, Yamaguchi (JP)

( * ) Notice: Subject to any disclaimer, the term of this patent is extended or adjusted under 35 U.S.C. 154(b) by 572 days.

(21) Appl. No.: 18/281,024

(22) PCT Filed: Mar. 2, 2022

(86) PCT No.: PCT/JP2022/008829
§ 371 (c)(1),
(2) Date: Sep. 8, 2023

(87) PCT Pub. No.: WO2022/190985
PCT Pub. Date: Sep. 15, 2022

(65) Prior Publication Data
US 2024/0154117 A1 May 9, 2024

(30) Foreign Application Priority Data
Mar. 12, 2021 (JP) ................................ 2021-039890

(51) Int. Cl.
*C01B 25/45* (2006.01)
*H01M 4/36* (2006.01)
(Continued)

(52) U.S. Cl.
CPC ........... *H01M 4/5825* (2013.01); *C01B 25/45* (2013.01); *H01M 4/366* (2013.01); *H01M 10/36* (2013.01);
(Continued)

(58) Field of Classification Search
None
See application file for complete search history.

(56) References Cited

U.S. PATENT DOCUMENTS 10,833,314 B2 11/2020 Yamauchi
2018/0166683 A1 6/2018 Yamauchi

FOREIGN PATENT DOCUMENTS

CN 107732167 * 2/2018 ............ B82Y 30/00
CN 108091921 A 5/2018
(Continued)

OTHER PUBLICATIONS

English translation of JP 2020/027733 (Year: 2020).*
(Continued)

*Primary Examiner* — Yoshitoshi Takeuchi
(74) *Attorney, Agent, or Firm* — GREENBLUM & BERNSTEIN, P.L.C.

(57) ABSTRACT

Provided are a sodium titanium phosphate salt and, additionally, at least one of a negative electrode active material that gives a sodium secondary battery having superior power characteristics as compared to conventional aqueous sodium secondary batteries and a sodium secondary battery including such a negative electrode active material. In particular,
(Continued)

provided is a negative electrode active material that gives an aqueous sodium secondary battery having superior power characteristics as compared to conventional aqueous sodium secondary batteries including NASICON type $NaTi_2(PO_4)_3$ as a negative electrode active material.

A sodium titanium phosphate salt represented by the general formula $Na_{1+x}Ti_2(PO_4)_3$ (where $0 \leq x \leq 2$) includes a surface layer containing $Na_5Ti(PO_4)_3$.

9 Claims, 4 Drawing Sheets

(51) Int. Cl.

| | |
|---|---|
| ***H01M 4/58*** | (2010.01) |
| ***H01M 10/36*** | (2010.01) |
| *H01M 4/02* | (2006.01) |

(52) U.S. Cl.

CPC ...... *C01P 2002/60* (2013.01); *C01P 2004/84* (2013.01); *C01P 2006/40* (2013.01); *H01M 2004/021* (2013.01); *H01M 2004/027* (2013.01)

(56) References Cited

FOREIGN PATENT DOCUMENTS

| | | | | |
|---|---|---|---|---|
| JP | 2011-241138 A | | 12/2011 | |
| JP | 2012-54208 A | | 3/2012 | |
| JP | 2019-175830 A | | 10/2019 | |
| JP | 2020/027733 | * | 2/2020 | ............ C01B 25/45 |
| WO | 2017/026228 A1 | | 2/2017 | |

OTHER PUBLICATIONS

English translation of CN107732167 (Year: 2018).*

International Search Report issued Apr. 26, 2022 in International Bureau of WIPO Patent Application No. PCT/JP2022/008829 with an English translation thereof.

Written Opinion issued Apr. 26, 2022 in International Bureau of WIPO Patent Application No. PCT/JP2022/008829 with an English translation thereof.

Ruben Simon et al., "A High-Voltage Aqueous Electrolyte for Sodium-Ion Batteries", ACS Energy Letters, 2017, pp. 2005-2006.

Sun Il Park et al., "Electrochemical Properties of NaTi2(PO4)3 Anode for Rechargeable Aqueous Sodium-Ion Batteries", Journal of The Electrochemical Society, 2011, pp. A1067-A1070.

* cited by examiner

SODIUM TITANIUM PHOSPHATE SALT AND USE THEREOF

TECHNICAL FIELD

The present disclosure relates to sodium titanium phosphate salts and uses thereof.

BACKGROUND ART

Sodium secondary batteries, which do not use lithium, which is a rare metal, are not only advantageous in terms of resource and cost, but also have potential for the application of novel materials and superior high-rate charge/discharge characteristics.

Sodium secondary batteries that have so far been studied include electrolyte solutions similar to those for existing lithium secondary batteries, mainly nonaqueous electrolyte solutions.

Recently, it has been reported that the narrow potential window of aqueous batteries, i.e., 1.23 V, due to decomposition of water, which is the weakest point of aqueous batteries, exceeds 2 V at high electrolyte concentrations (NPL 1), and there is a growing expectation for practical application of aqueous sodium secondary batteries.

In particular, aqueous sodium secondary batteries using aqueous electrolyte solutions are suitable for increasing battery size in terms of cost and safety.

Another issue with practical application of aqueous sodium secondary batteries is a negative electrode material. Although it has been found that NASICON type $NaTi_2(PO_4)_3$ functions as a negative electrode material, improving its low cycle stability has been a challenge (NPL 2).

CITATION LIST

Non Patent Literature

NPL 1: Ruben-Simon et al., ACS Energy Letters, 2, 2005 (2017)

NPL 2: Sun Il Park et al., Journal of The Electrochemical Society, 158 (10) A1067-A1070 (2011)

SUMMARY OF INVENTION

Technical Problem

An object of the present disclosure is to provide a sodium titanium phosphate salt and, additionally, at least one of a negative electrode active material that gives a sodium secondary battery having superior power characteristics as compared to conventional aqueous sodium secondary batteries and a sodium secondary battery including such a negative electrode active material. In particular, an object of the present disclosure is to provide a negative electrode active material that gives an aqueous sodium secondary battery having superior power characteristics as compared to conventional aqueous sodium secondary batteries including NASICON type $NaTi_2(PO_4)_3$ as a negative electrode active material.

Solution to Problem

In the present disclosure, it has been found that a sodium titanium phosphate salt composition including a surface layer containing a sodium titanium phosphate salt having a different composition has superior power characteristics as compared to conventionally known sodium secondary battery negative electrode materials and that such a sodium titanium phosphate salt composition can be used for a negative electrode to form a sodium secondary battery having superior power characteristics.

Specifically, the present invention is as described in the claims, and a summary of the present disclosure is as follows.

[1] A sodium titanium phosphate salt represented by the general formula $Na_{1+x}Ti_2(PO_4)_3$ (where $0 \leq x \leq 2$), the sodium titanium phosphate salt including a surface layer containing $Na_5Ti(PO_4)_3$.

[2] The sodium titanium phosphate salt according to [1] above, wherein the sodium titanium phosphate salt has a NASICON type crystal structure.

[3] The sodium titanium phosphate salt according to [1] or [2] above, wherein the surface layer is present in an amount of more than 0% by mass and less than 5% by mass relative to the sodium titanium phosphate salt represented by the general formula $Na_{1+x}Ti_2(PO_4)_3$ (where $0 \leq x \leq 2$).

[4] The sodium titanium phosphate salt according to any one of [1] to [3] above, wherein the surface layer has a thickness of more than 0 nm and 50 nm or less.

[5] The sodium titanium phosphate salt according to any one of [1] to [4] above, wherein the sodium titanium phosphate salt has a crystallite size of 10 nm or more and 100 nm or less.

[6] A method for manufacturing the sodium titanium phosphate salt according to any one of [1] to [5] above, comprising a step of calcining a mixture containing a sodium source, a phosphate source and a titanium source at 150° C. or higher and 400° C. or lower to obtain a primary calcined product, disintegrating the primary calcined product and then calcining the primary calcined product at 400° C. or higher and 900° C. or lower.

[7] A negative electrode active material comprising the sodium titanium phosphate salt according to any one of [1] to [5] above.

[8] A sodium secondary battery comprising a negative electrode containing the sodium titanium phosphate salt according to any one of [1] to [5] above, a positive electrode and an electrolyte solution.

[9] The sodium secondary battery according to [8] above, wherein the electrolyte solution is an aqueous electrolyte solution.

Advantageous Effects of Invention

According to the present disclosure, it is possible to provide a sodium titanium phosphate salt and, additionally, at least one of a negative electrode active material that gives a sodium secondary battery having superior power characteristics as compared to conventional aqueous sodium secondary batteries and a sodium secondary battery including such a negative electrode active material. Furthermore, it is possible to provide a negative electrode active material that gives an aqueous sodium secondary battery having superior power characteristics as compared to conventional aqueous sodium secondary batteries including NASICON type $NaTi_2(PO_4)_3$ as a negative electrode active material.

Example 1, c: Example 2, d: Example 3, e: PDF pattern (ICDD: 33-1296 $NaTi_2(PO_4)_3$).

Figure 2:
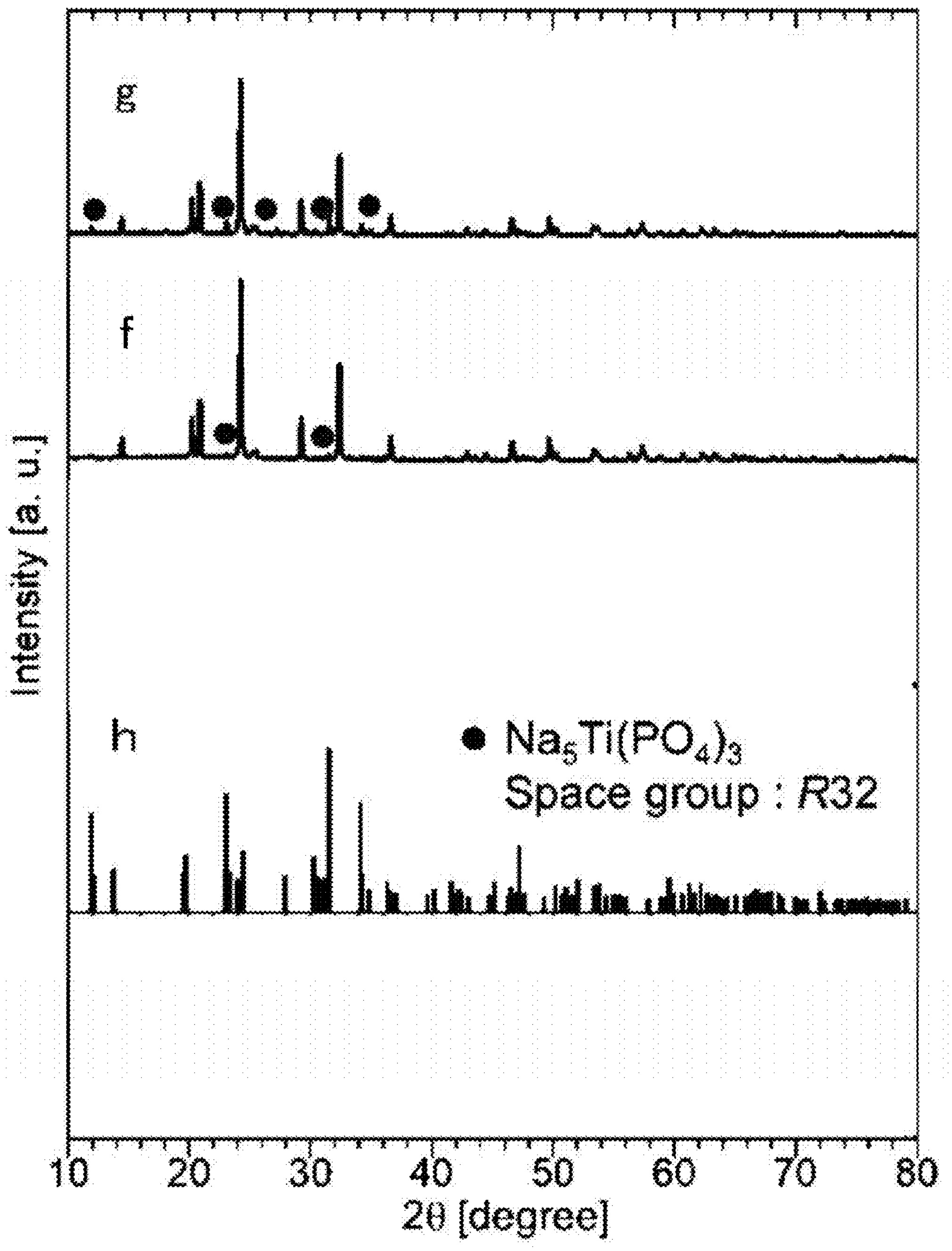

FIG. 2 is a graph showing XRD patterns of $NaTi_2(PO_4)_3$ of Examples 5 and 6 (f: Example 5, g: Example 6, h: PDF pattern ($Na_5Ti(PO_4)_3$).

Figure 3A:
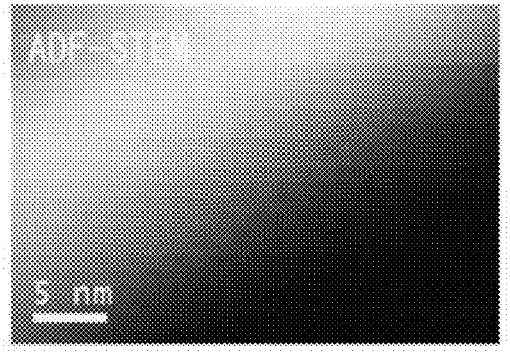

FIG. 3A is a micrograph showing a cross-sectional TEM observation image of the sodium transition metal phosphate salt of Example 2.

Figure 3B:
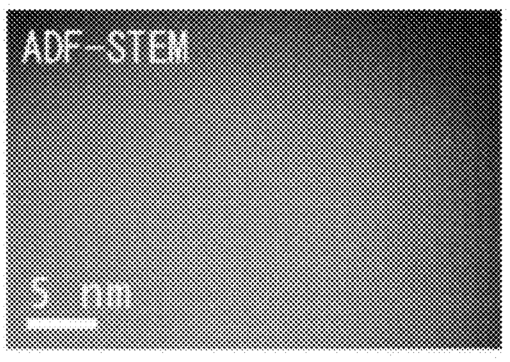

FIG. 3B is a micrograph showing a cross-sectional TEM observation image of the sodium transition metal phosphate salt of Comparative Example 1.

Figure 4:
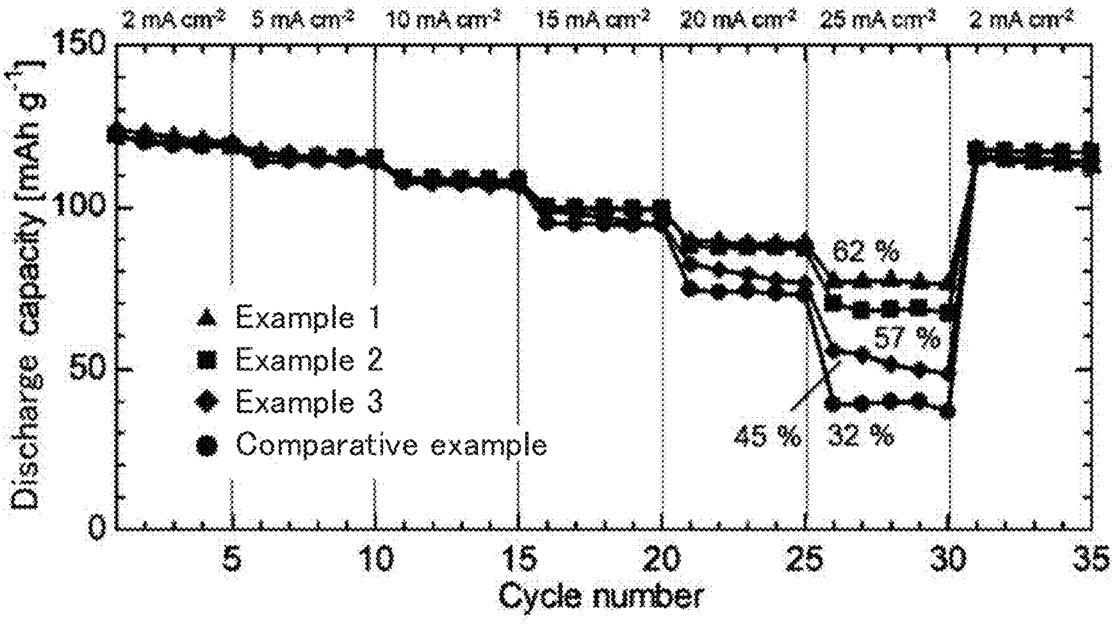

FIG. 4 is a graph showing the results of a charge/discharge cycle test for Examples 1 to 3 and Comparative Example 1 (a (▲): Example 1, b (■): Example 2, c (♦): Example 3, d (●): Comparative Example 1).

DESCRIPTION OF EMBODIMENTS

A sodium titanium phosphate salt of the present disclosure will be described below with reference to an example embodiment.

<Sodium Titanium Phosphate Salt>

This embodiment is a sodium titanium phosphate salt represented by the general formula $Na_{1+x}Ti_2(PO_4)_3$ (where $0 \leq x \leq 2$) and including a surface layer containing $Na_5Ti(PO_4)_3$. Because the sodium titanium phosphate salt (hereinafter also referred to as "NaTP salt") includes a surface layer containing $Na_5Ti(PO_4)_3$, sodium ions ($Na^+$) diffuse easily in the surface of the NaTP salt.

The NaTP salt of this embodiment is a phosphate compound containing sodium and titanium. Specifically, the NaTP salt is a sodium titanium phosphate salt represented by the general formula $Na_{1+x}Ti_2(PO_4)_3$ (where $0 \leq x \leq 2$), more preferably $NaTi_2(PO_4)_3$ (i.e., x=0 in the general formula $Na_{1+x}Ti_2$ $(PO_4)$). In this embodiment, the composition of the NaTP salt can be determined by a known composition analysis technique such as inductively coupled plasma emission spectroscopy (ICP analysis), atomic absorption spectrometry or TEM-EDS, and can be determined by ICP analysis using a common ICP emission spectrometer (ICPS-8100, manufactured by Shimadzu Corporation).

The NaTP salt of this embodiment preferably has a NASICON type crystal structure (so-called NASICON type NaTP salt). The NASICON type crystal structure can be determined by comparing an XRD pattern of the NaTP salt of this embodiment with a PDF pattern (ICDD: 33-1296 $NaTi_2(PO_4)_3$).

The NaTP salt of this embodiment includes a surface layer containing $Na_5Ti(PO_4)_3$ (hereinafter also simply referred to as "surface layer"). Because the surface layer has a composition containing excess sodium relative to the sodium titanium phosphate salt represented by the general formula $Na_{1+x}Ti_2(PO_4)_3$ (where $0 \leq x \leq 2$), it is believed that the surface layer functions as a sodium buffer layer during high-power discharging, thus providing superior power characteristics.

It is sufficient that the surface layer be present in at least a portion of the NaTP salt, preferably in at least a portion of the surface of the NaTP salt, in a state in which the surface layer does not interfere with diffusion of sodium. The form in which the surface layer is present in at least a portion of the NaTP salt may be a form in which at least the NaTP salt and $Na_5Ti(PO_4)_3$ are present with an interface therebetween, that is, a form in which the surface layer and the NaTP salt form an interface therebetween. Because the NaTP salt and $Na_5Ti(PO_4)_3$ have an interface therebetween, it is believed that the NaTP salt exhibits a sodium diffusion coefficient similar to that of a NaTP salt including no surface layer.

The surface layer need not cover the entire surface of the NaTP salt, but may be formed in an islands-in-sea pattern. That is, it is sufficient that the surface layer be at least one of $Na_5Ti(PO_4)_3$ and a $Na_5Ti(PO_4)_3$-containing composition, preferably $Na_5Ti(PO_4)_3$, present in at least a portion of the surface of the NaTP salt.

It is sufficient that the surface layer contain $Na_5Ti(PO_4)_3$. Although the surface layer may contain $TiO_2$ in addition to $Na_5Ti(PO_4)_3$, the surface layer is preferably formed of $Na_5Ti(PO_4)_3$, more preferably $Na_5Ti(PO_4)_3$ having a NASICON type crystal structure.

It is sufficient that the surface layer be present in the entirety or at least a portion of the surface of the NaTP salt of this embodiment, and it is sufficient that the surface layer be present in at least a portion of the NaTP salt of this embodiment. In addition, it is sufficient that $Na_5Ti(PO_4)_3$ be present in the entirety or at least a portion of the surface of the NaTP salt particles, preferably in at least a portion of the surface of the NaTP salt particles. There is no particular limitation on the form of $Na_5Ti(PO_4)_3$ present in the surface layer; for example, $Na_5Ti(PO_4)_3$ may be crystalline or amorphous, or both, and may be dense or porous, or both. Furthermore, the surface layer preferably contains $Na_5Ti(PO_4)_3$ as produced by the reaction of a sodium source, a phosphorous source and a titanium source in the surface of the NaTP salt. This tends to reduce polarization (hysteresis) during charge/discharge cycles. The presence of the surface layer as a covering film can be determined by transmission electron microscopy (TEM) observation. In TEM observation, the surface layer is observed as a different field image from the NaTP salt, and the surface layer is observed as a darker field image than the NaTP salt.

The lower limit of the proportion of the surface layer (hereinafter also referred to as "amount of covering") in this embodiment is preferably more than 0% by mass, or 0.01% by mass or more, or 0.1% by mass or more, relative to the NaTP salt because there is a tendency that sodium ions (Na) diffuse more easily. On the other hand, the upper limit is preferably 20% by mass or less, or 15% by mass or less, or 5% by mass or less, relative to the NaTP salt. These upper and lower limits may be set in any combination. Therefore, the proportion of the surface layer in this embodiment is preferably, for example, more than 0% by mass and 20% by mass or less, or 0.01% by mass or more and 15% by mass or less, or 0.1% by mass or more and 5% by mass or less, relative to the NaTP salt. The amount of covering may be measured by any technique, for example, by quantitative analysis using TEM-EDS. If the amount of covering is more than 20% by mass, the surface layer is not formed in a state in which the surface layer does not interfere with diffusion of sodium, thus considerably decreasing the diffusion coefficient of sodium ions.

The surface layer may have any thickness as long as the surface layer does not interfere with diffusion of sodium.

The lower limit of the thickness of the surface layer is preferably more than 0 nm, or 0.1 nm or more. On the other hand, the upper limit is preferably 50 nm or less, or 40 nm or less, or 5 nm or less. These upper and lower limits may be set in any combination. Therefore, the thickness of the surface layer of this embodiment is preferably, for example, more than 0 nm and 50 nm or less, or 0.1 nm or more and 5 nm or less. The thickness of the surface layer can be determined by TEM observation, and the thickness of the surface layer as observed in a TEM observation image (i.e., the surface layer can be observed in a TEM observation image, and the maximum thickness of the surface layer as observed in the TEM observation image) may be more than 0 nm or 0.1 nm or more, and 50 nm or less, 40 nm or less, 5 nm or less or 3 nm or less.

The lower limit of the crystallite size of the NaTP salt of this embodiment is preferably 10 nm or more, or 20 nm or more, or 30 nm or more. On the other hand, the upper limit is preferably 100 nm or less, or 50 nm or less, or 40 nm or less. These upper and lower limits may be set in any combination. Therefore, the crystallite size of the NaTP salt of this embodiment is preferably, for example, 10 nm or more and 100 nm or less, or 20 nm or more and 50 nm or less, or 20 nm or more and 40 nm or less, or 30 nm or more and 40 nm or less. If the crystallite size falls within such ranges, intercalation and deintercalation of sodium into and from the NaTP salt of this embodiment proceed more efficiently, and the NaTP salt of this embodiment can be expected to have superior power characteristics as a negative electrode active material for sodium secondary batteries.

In this embodiment, "crystallite size" refers to a size determined from two or more XRD peaks attributed to an XRD pattern of the sodium titanium phosphate salt represented by the general formula $Na_{1+x}Ti_2(PO_4)_3$ (where $0 \le x \le 2$) by the Williamson-Hall method (hereinafter also referred to as "WH size"). Specifically, the following plot is performed for two or more XRD peaks attributable to the general formula $Na_{1+x}Ti_2(PO_4)_3$ (where $0 \le x \le 2$), preferably all XRD peaks attributable to the general formula $Na_{1+x}Ti_2(PO_4)_3$ (where $0 \le x \le 2$). The following first-order approximation equation is determined from the resulting plotted points by the least-squares method. The crystallite size is the reciprocal of the y-intercept of the first-order approximation equation.

<Plot>

$$Y=(\beta \cdot \sin \theta)/\lambda$$

$$X=\sin \theta/\lambda$$

<First-Order Approximation Equation>

$$Y=2\eta \cdot X+(1/\varepsilon) \quad \text{(equation 1)}$$

In these equations, β is the full width at half maximum (°), θ is the diffraction angle (°), λ is the wavelength (nm) of the radiation source, η is the inhomogeneous strain, ε is the crystallite size (Å) and 1/ε in the first-order approximation equation is the y-intercept. There is no particular limitation on the XRD peaks used to calculate the WH size in this embodiment. For example, all XRD peaks attributed to the NaTP may be used.

A sodium secondary battery including the NaTP salt of this embodiment as a negative electrode active material exhibits superior power characteristics. The configuration of the sodium secondary battery and the charging/discharging test conditions are given below:

(Sodium Secondary Battery)

Electrolyte solution: 17 mol/kg $NaClO_4$ aqueous solution

Negative electrode: negative electrode containing 70% by mass of NaTP salt, 25% by mass of acetylene black and 5% by mass of polytetrafluoroethylene Positive electrode: positive electrode containing 70% by mass of $Na_2Ni[Fe(CN)_6]$, 25% by mass of acetylene black and 5% by mass of polytetrafluoroethylene (Charging/Discharging Test Conditions)

Current density:

(1st to 5th cycles) 2 $mA/cm^2$ (6th to 10th cycles) 5 $mA/cm^2$ (11th to 15th cycles) 10 $mA/cm^2$ (16th to 20th cycles) 15 $mA/cm^2$ (21st to 25th cycles) 20 $mA/cm^2$ (25th to 30th cycles) 25 $mA/cm^2$ (31st to 35th cycles) 2 $mA/cm^2$ Voltage: −0.9 V to −0.3 V (vs Ag/AgCl reference electrode)

Charging/discharging temperature: 25° C.

<Method for Manufacturing NaTP Salt Including Surface Layer>

Although the NaTP salt of this embodiment may be manufactured by any method, an example method of manufacture comprises a step of calcining a mixture containing a sodium source, a phosphate source and a titanium source at 150° C. or higher and 400° C. or lower to obtain a primary calcined product, disintegrating the primary calcined product and then calcining the primary calcined product at 400° C. or higher and 900° C. or lower (hereinafter also referred to as "calcining step"). Thus, a NaTP salt including a surface layer containing $Na_5Ti(PO_4)_3$ can be obtained.

The mixture subjected to the calcining step contains a sodium source, a phosphate source and a titanium source (which are hereinafter also collectively referred to as "precursor") and is a composition containing precursors.

The sodium source may be any compound containing sodium (Na) and is preferably one or more selected from the group consisting of sodium carbonate, sodium hydroxide and sodium chloride, or at least one of sodium carbonate and sodium hydroxide, or sodium carbonate.

The phosphate source may be any compound containing phosphate ($PO_4$) and is preferably one or more selected from the group consisting of pyrophosphoric acid, polyphosphoric acid and ammonium dihydrogen phosphate, or ammonium dihydrogen phosphate.

The titanium source may be any compound containing titanium (Ti) and may be at least one of a titanium oxide and an organic titanium compound. A preferred titanium oxide is titania ($TiO_2$). A preferred organic titanium compound is one or more selected from the group consisting of titanium-containing alkoxides, acylates and chelate compounds, or a titanium-containing alkoxide, or titanium tetrabutoxide ($Ti(OCH_2CH_2CH_2CH_3)_4$). A preferred titanium source is titanium tetrabutoxide.

Particularly preferred precursors are sodium carbonate, diammonium hydrogen phosphate and titanium tetrabutoxide.

The composition of the mixture is preferably a composition containing excess sodium relative to the composition of the NaTP salt, particularly the sodium titanium phosphate salt represented by the general formula $Na_{1+x}Ti_2(PO_4)_3$ (where $0 \le x \le 2$). For example, the ratio of Na [mol] to Ti [mol] in the mixture composition may be more than 1.0 or 1.1 or more and may be 3 or less, 2 or less or 1.5 or less. It is believed that a mixture having such a composition forms a surface layer in the surface of the particles of the NaTP salt through preliminary calcining and main calcining, described later.

Such a mixture may be obtained by mixing together the precursors such that the mixture has a composition containing excess sodium relative to the target sodium titanium phosphate salt represented by the general formula $Na_{1+x}Ti_2(PO_4)_3$ (where $0 \le x \le 2$). For example, when a NaTP salt represented by $NaTi_2(PO_4)_3$ is manufactured, the sodium source and the titanium source may be mixed such that the ratio of Na [mol] to Ti [mol] is more than 0.5 or 0.55 or more and is 1.5 or less, 1 or less or 0.75 or less; when a NaTP salt represented by $Na_2Ti_2(PO_4)_3$ is manufactured, the sodium source and the titanium source may be mixed such that the ratio of Na [mol] to Ti [mol] is more than 1.0 or 1.1 or more and is 3 or less, 2 or less or 1.5 or less.

The mixture can be obtained by homogeneously mixing together the precursors. The mixing method may be, for example, at least one of wet mixing and dry mixing, or wet mixing. A particularly preferred mixing method includes drying a mixed solution containing the precursors and a solvent after or during stirring. The solvent may be, for example, at least one of water and an alcohol, or water. Stirring may be performed under any conditions that allow the precursors to be homogenously mixed together. For example, the mixed solution may be stirred at a stirring speed of 100 to 500 rpm, and the stirring speed may be increased as the amount of mixed solution increases. Drying may be performed under any conditions that allow the solvent to be removed from the mixed solution, for example, in air at 60° C. or higher or 70° C. or higher and 150° C. or lower, 120° C. or lower or 100° C. or lower. Thus, a mixture in which the precursors are homogeneously mixed together can be obtained.

In the method of manufacture of this embodiment, the mixture is calcined at 150° C. or higher and 400° C. or lower. An example method of calcining for obtaining a primary calcined product (hereinafter also referred to as "preliminary calcining") includes calcining in an oxidizing atmosphere, preferably in air, at 150° C. or higher, 250° C. or higher or 300° C. or higher and 400° C. or lower, lower than 400° C. or 370° C. or lower. The preliminary calcining time may be any length of time, for example, 30 minutes or more and 10 hours or less. It is believed that preliminary calcining produces a composition with a gradient in sodium concentration in the surface of and inside the particles of the mixture such that the sodium concentration is higher in the surface of the particles than inside the particles.

After preliminary calcining, the resulting primary calcined product is disintegrated. The primary calcined product may be disintegrated by any method that eliminates loose aggregation of the primary calcined product, for example, by dry grinding using a mortar.

In the method of manufacture of this embodiment, the primary calcined product after disintegration is calcined at 400° C. or higher and 900° C. or lower (hereinafter also referred to as "main calcining". An example method of main calcining includes calcining in an oxidizing atmosphere, preferably in air, at 400° C. or higher, higher than 400° C. or 600° C. or higher and 900° C. or lower, 800° C. or lower or 750° C. or lower. The main calcining time may be any length of time, for example, 30 minutes or more and 10 hours or less. Main calcining produces a NaTP salt including a surface layer from the mixture having a composition with a gradient in sodium concentration.

<Negative Electrode Active Material>

Next, a negative electrode active material comprising the NaTP salt of the present disclosure will be described below with reference to an example embodiment.

In this embodiment, "negative electrode active material" refers to an electrode active material for an electrode, forming an electrochemical device, that has a lower potential, particularly an electrode active material for a negative electrode of a sodium secondary battery.

The negative electrode active material of this embodiment comprises the NaTP salt of this embodiment (i.e., a NaTP salt including a surface layer) and may be formed only of the NaTP salt of this embodiment (i.e., only of a NaTP salt including a surface layer). On the other hand, the negative electrode active material of this embodiment may contain an active material other than the NaTP salt of this embodiment, for example, an active material such as a sodium transition metal compound.

The negative electrode active material of this embodiment may have a covering layer, preferably a conductive covering layer (i.e., a conductive layer), such as a carbon layer or other layer, on a portion or the entirety of the surface of the negative electrode active material. In this case, the covering layer may be disposed on the surface layer containing $Na_5Ti(PO_4)_3$. However, the covering layer may be present on the surface of the NaTP salt.

<Sodium Secondary Battery>

Next, a sodium secondary battery comprising a negative electrode containing the NaTP salt of the present disclosure, a positive electrode and an electrolyte solution will be described below with reference to an example embodiment.

In this embodiment, "sodium secondary battery" refers to an electrochemical device in which charging and discharging occur through intercalation and deintercalation of sodium ions ($Na^+$) and has the same meaning as a sodium secondary battery, a sodium ion secondary battery, a sodium ion battery, a sodium rechargeable battery, a Na secondary battery, a Na ion battery, a Na rechargeable battery and the like.

"Nonaqueous electrolyte solution" refers to an electrolyte solution containing a nonaqueous solvent as a solvent. "Aqueous electrolyte solution" refers to an electrolyte solution containing an aqueous solvent as a solvent.

"Nonaqueous sodium secondary battery" refers to a sodium secondary battery including a nonaqueous electrolyte solution as an electrolyte solution. "Aqueous sodium secondary battery" refers to a sodium secondary battery including an aqueous electrolyte solution as an electrolyte solution.

<Negative Electrode>

It is sufficient that the negative electrode include a negative electrode mixture containing a negative electrode active material containing the NaTP salt of this embodiment and a current collector.

The negative electrode mixture contains the negative electrode active material, a binder, a conductor and optionally additives. Known binders, conductors and additives can be used.

The binder may be, for example, one or more selected from the group consisting of fluorocarbon resins, polyethylene, polypropylene, SBR materials and imide materials, or one or more selected from the group consisting of polyvinylidene fluoride (PVDF), polytetrafluoroethylene (PTFE) and ethylene tetrafluoroethylene (ETFE).

The conductor may be, for example, one or more selected from carbon materials, conductive fibers such as metal fibers, metal powders such as those of copper, silver, nickel and aluminum and organic conductive materials such as polyphenylene derivatives. Preferred examples of carbon materials include graphite, soft carbon, hard carbon, carbon black, ketjen black, acetylene black, activated carbon, carbon nanotubes, carbon fibers and mesoporous carbon.

The negative electrode mixture may be formed by a known method, and the negative electrode active material, the binder and the conductor may be mixed together in the desired ratio.

<Positive Electrode>

It is sufficient that the positive electrode include a positive electrode mixture containing a positive electrode active material, a current collector and optionally additives.

The positive electrode mixture contains the positive electrode active material, a binder, a conductor and optionally additives.

The positive electrode active material may contain any material that does not interfere with intercalation and deintercalation of sodium ions into and from the negative electrode active material, for example, at least one of a sodium-containing transition metal oxide, a sodium-containing polyanionic compound and a carbon-based material.

Any known binder and conductor may be used, and binders and conductors similar to those that can be used for the negative electrode mixture may be used.

The positive electrode mixture may be formed by a known method, and the positive electrode active material, the binder and the conductor may be mixed together in the desired ratio.

<Electrolyte Solution>

The electrolyte solution is a nonaqueous electrolyte solution or an aqueous electrolyte solution, preferably an aqueous electrolyte solution.

The electrolyte is a sodium salt, preferably a soluble sodium salt. A preferred example of the electrolyte is one or more selected from the group consisting of NaCl, $Na_2SO_4$, $NaNO_3$, $NaClO_4$, NaOH and $Na_2S$. For ease of handling, it is preferred that the electrolyte be one or more selected from the group consisting of NaCl, $Na_2SO_4$, $NaNO_3$ and $NaClO_4$, more preferably at least one of NaCl and $NaClO_4$.

Although there is no particular limitation on the electrolyte concentration in the electrolyte solution, an electrolyte solution having a higher electrolyte concentration (sodium salt concentration) is preferred to increase the energy density of the sodium secondary battery. For example, the sodium salt concentration may be 1 mol/kg (1 m) or more and less than or equal to the saturation solubility.

The electrolyte solution may contain an additive. Although there is no particular limitation, the additive may be, for example, one or more selected from the group consisting of succinic acid, glutamic acid, maleic acid, citraconic acid, gluconic acid, itaconic acid, diglycol, cyclohexanedicarboxylic acid, cyclopentanetetracarboxylic acid, 1,3-propanesultone, 1,4-butanesultone, methyl methanesulfonate, sulfolane, dimethyl sulfone and N,N-dimethylmethanesulfonamide. The amount of the additive may be, for example, 0.01% by mass or more and 10% by mass or less as the mass fraction of the additive relative to the mass of the electrolyte solution.

<Other Components>

For other components such as the current collectors of the positive and negative electrodes and a separator, those known and used for sodium secondary batteries and lithium secondary batteries can be used.

The sodium secondary battery including the negative electrode containing the NaTP salt of this embodiment exhibits a higher cycle stability than conventional sodium secondary batteries, particularly conventional aqueous sodium secondary batteries including NASICON type $NaTi_2(PO_4)_3$ as a negative electrode active material.

EXAMPLES

Next, the present disclosure will be described with reference to examples. However, the present disclosure should not be construed as being limited to these examples.

<Evaluation of Crystallinity>

The crystal structure of each NaTP salt was determined using a desktop X-ray diffractometer (device name: MiniFlex 600/ASC-8, manufactured by Rigaku Corporation) under the following conditions.

Target: Cu

Power: 0.6 kW (15 mA-40 kV)

Step scan: 0.02° (2θ/θ)

Measurement time: 0.05 seconds

<Composition Analysis>

The composition of each NaTP salt was determined by dissolving 50 mg of a sample in an aqueous solution containing 10 mL of 35% hydrochloric acid and 1 mL of 35% aqueous hydrogen peroxide and subjecting the resulting solution to ICP analysis. The ICP analysis was performed using an ICP emission spectrometer (device name: ICPS-8100, manufactured by Shimadzu Corporation).

<Observation of Surface Layer>

The surface layer was observed under a transmission electron microscope (device name: JEM-2100, manufactured by JEOL Ltd.) and a thermal field-emission scanning electron microscope (device name: JSM-7600F, manufactured by JEOL Ltd.).

<Sodium Secondary Battery>

(Fabrication of Positive Electrode)

Nickel hexacyanoferrate, $Na_2Ni([Fe(CN)_6]$, having a cubic crystal structure was used as a positive electrode active material. $Na_2Ni([Fe(CN)_6]$ was synthesized in the following manner. Specifically, 2.69 g of 10 mmol $Ni(OCOCH_3)_2 \cdot 4H_2O$ was dissolved in 175 mL of $H_2O$ and 25 mL of N,N-dimethylformamide (DMF, $HCON(CH_3)_2$) to obtain a first solution. On the other hand, 4.84 g of 10 mmol $Na_4[Fe(CN)_6] \cdot 10H_2O$ and 7 g of NaCl were dissolved in 175 mL of $H_2O$ to obtain a second solution.

After the first solution was slowly added to the second solution, they were reacted at room temperature with stirring for 72 hours to obtain a precipitate. The resulting precipitate was collected by centrifugation, was washed with methanol and was dried in air to obtain nickel hexacyanoferrate ($Na_2Ni[Fe(CN)_6]$) having a cubic crystal structure.

The resulting $Na_2Ni([Fe(CN)_6]$, acetylene black (hereinafter also referred to as "AB") and polytetrafluoroethylene (hereinafter also referred to as "PTFE") were mixed together in a mass ratio of 70:25:5 and were then formed into a pellet having a diameter 3 mm to obtain a positive electrode (positive electrode mixture).

(Fabrication of Negative Electrode)

A negative electrode active material and AB were mixed together in a mass ratio of 84:16 using a planetary ball mill at 400 rpm in an Ar atmosphere for 1 hour to obtain a mixture. Subsequently, the mixture was subjected to carbothermal treatment at 800° C. in an Ar stream for 1 hour and was then mixed with PTFE in a mass ratio of 95:5 and formed into a pellet having a diameter of 2 mm to obtain a negative electrode (negative electrode mixture).

(Fabrication of Aqueous Sodium Secondary Battery)

An aqueous sodium secondary battery including the positive electrode mixture as a working electrode (electrode corresponding to a positive electrode), the negative electrode mixture as a counter electrode (electrode corresponding to a negative electrode), a silver chloride electrode (Ag/AgCl) as a reference electrode and a $NaClO_4$ aqueous solution having an electrolyte concentration ($NaClO_4$ concentration) of 17 m as an electrolyte solution was fabricated.

(Synthesis of NaTP Salt)

Example 1

40 mL of an ethanol solution having $Ti(OCH_2CH_2CH_2CH_3)_4$ dissolved therein was mixed with citric acid in twice the equimolar amount relative to $Ti(OCH_2CH_2CH_2CH_3)_4$ and aqueous hydrogen peroxide ($H_2O_2$) in twice the equimolar amount relative to $Ti(OCH_2CH_2CH_2CH_3)_4$ to obtain a mixed solution. To the resulting mixed solution were added $Na_2CO_3$ in 1.05 times the equimolar amount relative to $Ti(OCH_2CH_2CH_2CH_3)_4$ (in a molar ratio of Na to Ti of 0.525) and $NH_4H_2PO_4$ in the equimolar amount relative to $Ti(OCH_2CH_2CH_2CH_3)_4$. The solution was evaporated to dryness at 60° C. for 30 minutes and then at 80° C. for 1 to 2 hours while being stirred at 500 rpm, followed by heating at 350° C. in air for 5 hours. The resulting solid was ground and mixed and was heated at 700° C. in air for 12 hours to obtain $NaTi_2(PO_4)_3$ including a surface layer containing $Na_5Ti(PO_4)_2$ as a NaTP salt of this example. The crystallite size of the NaTP salt of this example was 36 nm, and the mass fraction of the surface layer was 1% by mass.

The resulting NaTP salt and AB were mixed together in a mass ratio of 84:16 using a planetary ball mill at 400 rpm in an argon atmosphere for 1 hour. The resulting mixture was calcined at 800° C. in an argon stream for 1 hour to obtain a negative electrode active material comprising $NaTi_2(PO_4)_3$ having a NASICON type structure and including a surface layer (NASICON type $NaTi_2(PO_4)_3$).

Example 2

$NaTi_2(PO_4)_3$ having a NASICON type structure and including a surface layer and a negative electrode active material were obtained in the same manner as in Example 1 except that $Na_2CO_3$ was added in 1.1 times the equimolar amount (in a molar ratio of Na to Ti of 0.55). The crystallite size of the NaTP salt of this example was 38 nm, and the mass fraction of the surface layer was 2% by mass.

Example 3

$NaTi_2(PO_4)_3$ having a NASICON type structure and including a surface layer and a negative electrode active material were obtained in the same manner as in Example 1 except that $Na_2CO_3$ was added in 1.15 times the equimolar amount (in a molar ratio of Na to Ti of 0.575). The crystallite size of the NaTP salt of this example was 41 nm.

Example 4

$NaTi_2(PO_4)_3$ having a NASICON type structure and including a surface layer and a negative electrode active material were obtained in the same manner as in Example 1 except that $Na_2CO_3$ was added in 1.2 times the equimolar amount (in a molar ratio of Na to Ti of 0.6). The crystallite size of the NaTP salt of this example was 49 nm.

Example 5

$NaTi_2(PO_4)_3$ having a NASICON type structure and including a surface layer and a negative electrode active material were obtained in the same manner as in Example 1 except that $Na_2CO_3$ was added in 1.5 times the equimolar amount (in a molar ratio of Na to Ti of 0.75). The crystallite size of the NaTP salt of this example was 50 nm.

Example 6

$NaTi_2(PO_4)_3$ having a NASICON type structure and including a surface layer and a negative electrode active material were obtained in the same manner as in Example 1 except that $Na_2CO_3$ was added in twice the equimolar amount (in a molar ratio of Na to Ti of 1). The crystallite size of the NaTP salt of this example was 50 nm.

Comparative Example 1

$NaTi_2(PO_4)_3$ having a NASICON type structure and including no surface layer containing $Na_5Ti(PO_4)_3$ and a negative electrode active material were obtained in the same manner as in Example 1 except that $Na_2CO_3$ was added in the equimolar amount (in a molar ratio of Na to Ti of 0.5). The crystallite size of the NaTP salt of this comparative example was 34 nm.

Figure 1:
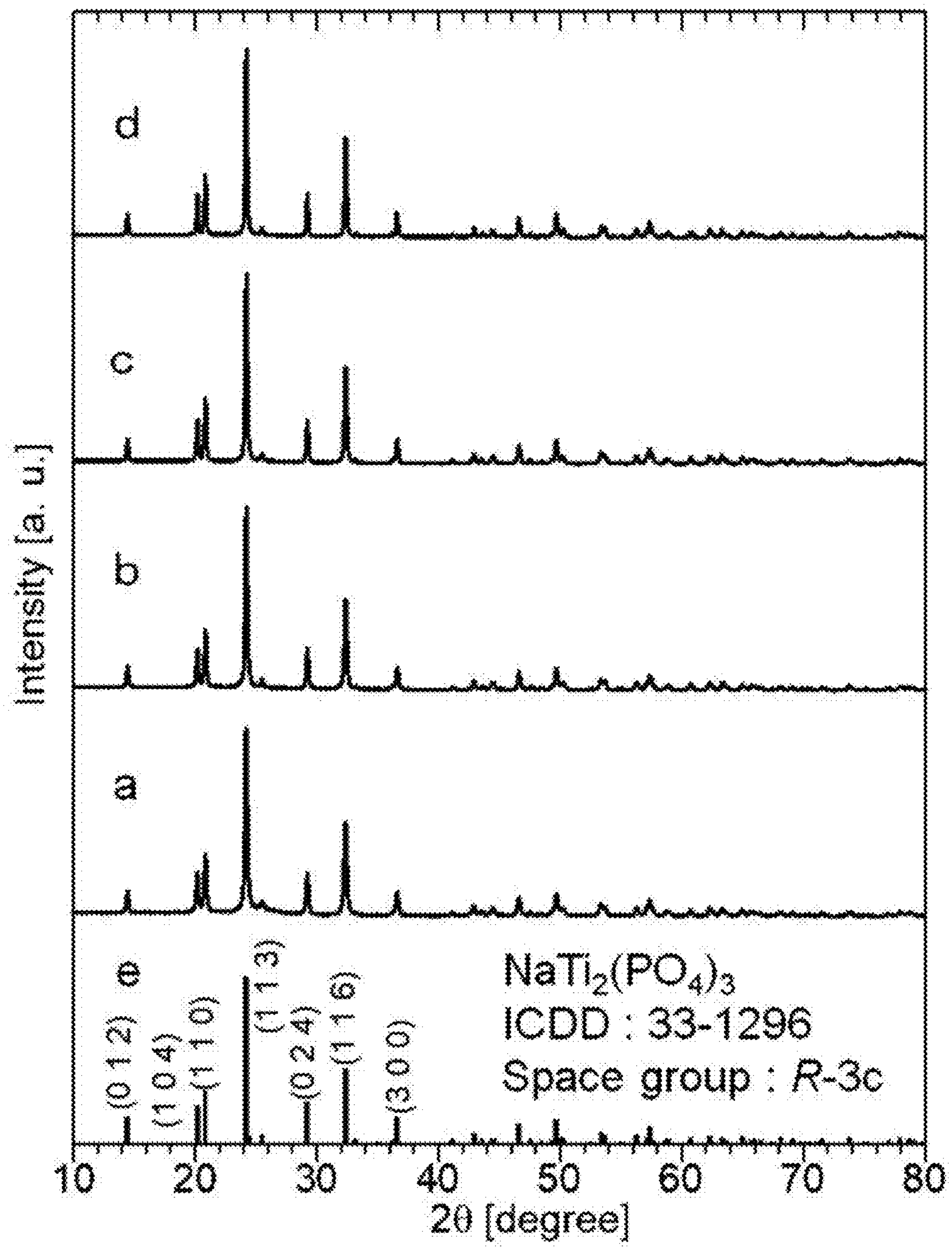
FIG. 1 is a graph showing XRD patterns of sodium transition metal phosphate salts of Examples 1 to 3 and the Comparative Example (a: Comparative Example 1, b.

FIGS. 1 and 2 show XRD patterns of the negative electrode active materials obtained in the Examples and the Comparative Example. XRD peaks for $NaTi_2(PO_4)_3$ were observed for all of the Examples and the Comparative Example. For Examples 5 and 6, XRD peaks attributed to $Na_5Ti(PO_4)_3$ were also observed. It was found from the Examples that a NaMP salt including a surface layer (covering layer) containing $Na_5Ti(PO_4)_3$ can be obtained.

FIG. 3A shows a cross-sectional TEM observation image of $NaTi_2(PO_4)_3$ of Example 2. FIG. 3B shows a cross-sectional TEM observation image of $NaTi_2(PO_4)_3$ of Comparative Example 1. For $NaTi_2(PO_4)_3$ of Example 2, $NaTi_2(PO_4)_3$ can be observed in white, a surface layer containing $Na_5Ti(PO_4)_3$ can be observed in gray, and the outside of the particles (background) can be observed in black (see FIG. 3A). Thus, it was confirmed that a surface layer having a thickness of 2 to 7 nm, or 5 nm, was present between $NaTi_2(PO_4)_3$ and the particles. In contrast, for $NaTi_2(PO_4)_3$ of Comparative Example 1, $NaTi_2(PO_4)_3$ can be observed in gray, and the outside of the particles (background) can be observed in black (see FIG. 3B). It was confirmed from FIGS. 3A and 3B that Example 2 and Comparative Example 1 differ in the surface structure of the $NaTi_2(PO_4)_3$ particles and that a surface layer was present in the surface of the $NaTi_2(PO_4)_3$ particles of Example 2.

<Measurement Example 1> (Charge/Discharge Cycle Test)

Aqueous sodium secondary batteries including the negative electrode active materials of the Examples and the Comparative Example were repeatedly charged and discharged under the following conditions to measure the discharge capacity for each charge/discharge cycle. The capacity retention was defined as the proportion (%) of the discharge capacity for the 30th cycle to the discharge capacity for the 1st cycle and was used to evaluate the power characteristics.

Current density:

(1st to 5th cycles) 2 $mA/cm^2$ (6th to 10th cycles) 5 $mA/cm^2$ (11th to 15th cycles) 10 $mA/cm^2$ (16th to 20th cycles) 15 $mA/cm^2$ (21st to 25th cycles) 20 $mA/cm^2$ (26th to 30th cycles) 25 $mA/cm^2$ (31st to 35th cycles) 2 $mA/cm^2$ Voltage: −0.9 V to −0.3 V (vs Ag/AgCl reference electrode)

Charging/discharging temperature: 25° C.

FIG. 4 show the discharge capacities for the 1st to 35th cycles. Table 1 below shows the capacity retention.

TABLE 1

| | Capacity retention |
|---|---|
| Example 1 | 62% |
| Example 2 | 57% |
| Example 3 | 45% |
| Comparative Example 1 | 32% |

FIG. 4 shows that the NaTP salts including a surface layer (covering layer) exhibited high charge/discharge capacity for high-power discharging at more than 20 $mA/cm^2$ and that this tendency was more noticeable for the Examples in which the amount of $Na_2CO_3$, which is believed to affect the composition of the surface layer, was smaller.

After 30 cycles, charging and discharging were performed at a discharge current density of 2 $mA/cm^2$. As a result, the Examples and the Comparative Example exhibited similar discharge capacities. Thus, it was confirmed that the surface layer has only a small influence on cycle characteristics and reduces the decrease in capacity during high-power discharging, that is, charging and discharging at high current density.

The present application claims priority to Japanese Patent Application No. 2021-39890, filed on Mar. 12, 2021, the entire contents of which are incorporated herein by reference.

The invention claimed is:

1. A sodium titanium phosphate salt represented by a general formula:

$$Na_{1+x}Ti_2(PO_4)_3$$

(where 0≤x≤2), the sodium titanium phosphate salt including a surface layer containing $Na_5Ti(PO_4)_3$.

2. The sodium titanium phosphate salt according to claim 1, wherein the sodium titanium phosphate salt has a NASICON type crystal structure.

3. The sodium titanium phosphate salt according to claim 1, wherein the surface layer is present in an amount of more than 0% by mass and less than 5% by mass relative to the sodium titanium phosphate salt represented by the general formula $Na_{1+x}Ti_2(PO_4)_3$ (where 0≤x≤2).

4. The sodium titanium phosphate salt according to claim 1, wherein the surface layer has a thickness of more than 0 nm and 50 nm or less.

5. The sodium titanium phosphate salt according to claim 1, wherein the sodium titanium phosphate salt has a crystallite size of 10 nm or more and 100 nm or less.

6. A negative electrode active material comprising the sodium titanium phosphate salt according to claim 1.

7. A sodium secondary battery comprising a negative electrode containing the sodium titanium phosphate salt according to claim 1, a positive electrode and an electrolyte solution.

8. The sodium secondary battery according to claim 7, wherein the electrolyte solution is an aqueous electrolyte solution.

9. A method for manufacturing the sodium titanium phosphate salt according to claim 1, comprising calcining a mixture containing a sodium source, a phosphate source and a titanium source at 150° C. or higher and 400° C. or lower to obtain a primary calcined product, disintegrating the primary calcined product and then calcining the primary calcined product at 400° C. or higher and 900° C. or lower.

* * * * *